(12) United States Patent
Gruener et al.

(10) Patent No.: US 8,352,125 B2
(45) Date of Patent: Jan. 8, 2013

(54) DETERMINATION OF A FORCE ACTING ON A STEERING MECHANISM

(75) Inventors: Stefan Gruener, Auenwald (DE); Thomas Werner, Rainau (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/317,625

(22) Filed: Oct. 24, 2011

(65) Prior Publication Data

US 2012/0083972 A1 Apr. 5, 2012

(30) Foreign Application Priority Data

Apr. 29, 2009 (DE) .......................... 10 2009 002 706

(51) Int. Cl.
*B62D 6/00* (2006.01)
*B62D 119/00* (2006.01)
*B62D 121/00* (2006.01)

(52) U.S. Cl. .......................................................... 701/41

(58) Field of Classification Search ........................ None
See application file for complete search history.

(56) References Cited

U.S. PATENT DOCUMENTS

| | | | |
|---|---|---|---|
| 6,687,588 B2 * | 2/2004 | Demerly et al. ................ | 701/41 |
| 6,983,816 B2 | 1/2006 | Takahashi et al. | |
| 7,036,626 B2 | 5/2006 | Niessen et al. | |
| 2002/0035424 A1 * | 3/2002 | Kaufmann et al. ............. | 701/41 |
| 2004/0084241 A1 | 5/2004 | Niessen et al. | |
| 2004/0238257 A1 | 12/2004 | Takahashi et al. | |
| 2009/0099731 A1 | 4/2009 | Watanabe et al. | |

FOREIGN PATENT DOCUMENTS

| | | |
|---|---|---|
| DE | 101 15 018 | 11/2002 |
| DE | 60 2004 003 090 | 6/2007 |
| EP | 2 050 655 | 4/2009 |

OTHER PUBLICATIONS

"SangJoo Kwon and Wan Kyun Chung; Perturbation Compensator based Robust Tracking Control and State Estimation of Mechanical Systems; Lecture Notes in Control and Information Sciences No. 307, 2004".

"Pau-Lo Hsu, Yow-Choung Hong and Syh-Shiuh Yeh; Design of an Optimal Unknown Input Observer for Load Compensation in Motion Systems; in Asian Journal of Control, vol. 3, No. 3, pp. 204-215, Sep. 2001".

* cited by examiner

*Primary Examiner* — Michael J. Zanelli
(74) *Attorney, Agent, or Firm* — Jordan and Hamburg LLP

(57) ABSTRACT

Provided is a way of using an estimator to determine a force (Fz), which acts from the outside on a steering gear of a steering device in a vehicle by way of a steering linkage, wherein a motor for generating a steering torque is assigned to the steering device. This is achieved by estimating the force (Fz) acting from the outside as a function of an effective motor torque (tor_RAeff), wherein the effective motor torque (tor_RAeff) is determined as a function of a motor torque and an efficiency, the efficiency being determined as a function of the estimated force (Fz).

19 Claims, 2 Drawing Sheets

DETERMINATION OF A FORCE ACTING ON A STEERING MECHANISM

BACKGROUND OF THE INVENTION

The invention relates to a method of using an estimator to determining a force, which acts from the outside on a steering gear of a steering device in a vehicle by way of a steering linkage, wherein a motor for generating a steering torque is assigned to the steering device.

The invention further relates to a control device for the control/regulation of a steering device in a vehicle, wherein the steering device comprises a steering linkage, a steering gear and a motor for generating a steering torque, and wherein the control device comprises means for detecting a motor torque of the motor and an estimator for determining a force acting from the outside on the steering gear.

The invention further relates to a computer program which can run on a control device for the control/regulation of a steering device.

In modern steering devices, in particular in an electric power steering system (EPS) or a so-called steer-by-wire (SbW) steering system, a force level is determined which is then present at a steering means, such as a steering wheel, and counteracts the force applied by the driver or amplifies the force applied by the driver in order to provide the driver with a driving feel that corresponds to the actual driving situation and, for example, to report back information about the current roadway conditions by way of the steering wheel. The magnitude of the force is therefore dependent upon the current driving state and, in particular, upon the transversal forces or the resulting forces that act on the steering by way of a steering linkage, e.g. tie rods.

In order to determine the force level, it is known to determine a transversal force on the basis of a lateral acceleration measured using appropriate sensors. It is likewise known to determine the lateral acceleration using a vehicle model on the basis of a current steering angle and a current vehicle speed and, on the basis thereof, to deduce the transversal force. To this end, a suitable vehicle model must be generated for every vehicle in which the lateral acceleration should be determined in this manner, which is, however, very time-consuming and cost-intensive.

A method is described in DE 101 15 018 A1, by way of which the desired force level is calculated and set on the basis of signals within the steering system. To this end, a motor torque is first determined for an electric motor assigned to the steering, which is necessary to permit torque-free steering. This motor torque is then multiplied by a factor which is dependent upon a current vehicle speed and a current manual torque applied by a driver. The result is the desired force level.

Furthermore, it is known from DE 101 15 018 A1 to use disturbance values such as tie rod forces to calculate the desired force level. Although such disturbance values can be measured in principle, measurement technology therefor is not installed in vehicles for reasons of cost. These disturbance values are therefore estimated.

SUMMARY OF THE INVENTION

The object of the present invention is to provide a way to determine tie rod forces and, in general, forces acting from the outside on the steering gear by way of a steering linkage. Such forces acting from the outside are primarily so-called transversal forces which correspond to the so-called tie rod forces. If the steering device is in the form of rack-and-pinion steering, the tie rod forces act on the rack connected to the tie rods. Except for frictional forces and/or inertial forces which may need to be accounted for, the tie rod forces therefore correspond to the so-called rack forces.

The object is achieved by a method of the initially stated type in that the force acting from the outside is estimated as a function of an effective motor torque, wherein the effective motor torque is determined as a function of a motor torque and efficiency, the efficiency being determined as a function of the estimated force.

The motor torque is the torque contributed by the motor, which takes the form of an electric motor or servo motor, for example, to the generation of steering torque. This motor torque is not supplied directly to the estimator or the observer, but rather is expressed with consideration for an efficiency. For example, the motor torque is multiplied by the efficiency. The efficiency, in turn, is determined as a function of the estimated force. The estimated force is therefore reincorporated in that the estimated force influences the determination of the effective motor torque which, in turn, is used for the determination or observation of the force acting from the outside, the effective motor torque being fed to the estimator as an input variable.

The efficiency determined according to the invention is therefore load-dependent. It is therefore possible to determine the force acting from the outside, or the rack force, in a particularly accurate manner. The method according to the invention functions particularly efficiently since feedback can be achieved easily and permits a precise determination of efficiency.

Preferably, the force is additionally estimated as a function of a rotor angle of the motor. The rotor angle corresponds to a current steering angle, and therefore a steering angle determined in another manner, e.g. by way of an angular-position sensor, can be used instead of the rotor angle. The rotor angle is supplied to the estimator as a further input. On the basis of the rotor angle or steering angle that is detected, it is possible to deduce a state of motion for the steering.

Advantageously, a sum of a steering torque acting on the steering by way of the steering shaft and the motor torque is generated. The effective motor torque is then determined as a function of this sum. The sum therefore describes the torque actually acting on the steering gear or the rack by way of the vehicle, which is counteracted by the forces acting from the outside. To detect the steering torque acting on the steering by way of the steering shaft, a suitable sensor can be mounted on the torsion bar, by way of which the torque applied by the driver to a steering wheel, for example, is determined. It is particularly advantageous to account for losses which occur due to joints or guides or bearings of the torsion bar and/or in the steering gear, for example. It is therefore possible to further increase the accuracy of the estimated force.

In one embodiment, the motor torque can describe an actual torque. Forces which were present at the point in time of detection of the actual torque are therefore determined. It is particularly advantageous for the motor torque to describe a target torque. Therefore, the forces acting from the outside with respect to this target torque can be taken into account even while the motor is being controlled to attain the target torque, and can then be taken into account when setting the desired force level to be presented at the steering wheel. It is therefore possible to present the force level at the steering wheel without delay in particular.

Preferably, the effective motor torque is also determined as a function of the steering angle or the actual rotor angle of the motor. Since the rotor angle and, therefore, the steering angle influence the transmission of forces acting from the outside on the steering, accounting for the rotor angle or the steering angle results in an improved determination of the effective motor torque, thereby permitting an even more precise determination of the forces acting from the outside, which should be taken into account.

In a preferred embodiment, the efficiency is determined by way of a characteristic curve. This makes it possible to determine the efficiency particularly rapidly during operation of the vehicle.

In a further preferred embodiment, the efficiency is determined as a function of a power flow direction of the motor. A distinction is made as to whether the motor is operated as a generator or a motor, and different efficiencies are then determined, which are read from different characteristic curves, for example. The motor is operated as a generator when the steering acts on the motor due to the force acting from the outside. The motor is operated as a motor when the motor acts on the steering and, therefore, ultimately on the wheels.

Advantageously, the power flow direction is determined as a function of the motor torque and the rotor angle of the motor. This makes it possible to determine the power flow direction on the basis of existing values.

The object is also achieved by way of a control device of the initially stated type in that the control device comprises means for carrying out the method according to the invention.

The embodiment of the method according to the invention is particularly significant in the form of a computer program which runs on a control device for the control of a steering device in a vehicle and, in particular, on a microprocessor in the control device, and is programmed to carry out the method according to the invention. In this case, the invention is therefore achieved by the computer program, and therefore this computer program expresses the invention in the same manner as the method for implementing the same, with which the computer program is programmed. The computer program is preferably stored on a memory element. As the memory element, it is possible to use, in particular, an optical, electric or magnetic storage medium, such as a digital versatile disc (DVD), a hard disc, a random access memory, a read-only memory or a flash memory.

Further features, possible applications and advantages of the invention will become apparent from the following description of exemplary embodiments of the invention, which will be explained with reference to the drawings.

DESCRIPTION OF THE PREFERRED EMBODIMENTS

Figure 1:
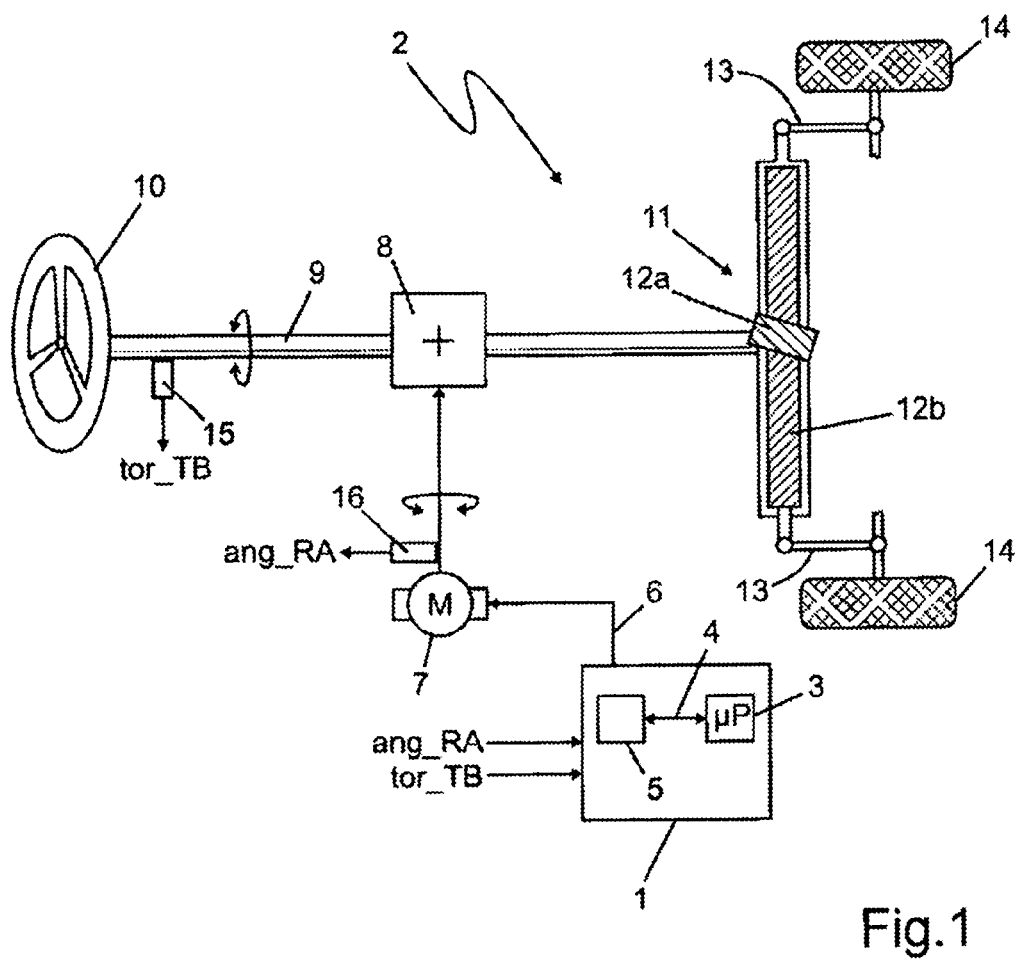
FIG. 1 shows a steering device comprising a control device according to the invention.

FIG. 1 shows a control device 1 which is assigned to a steering device 2. A microprocessor 3 is disposed in the control device 1, which is connected to a memory element 5 by way of a data line 4, e.g. a bus system. The control device 1 is connected to a motor 7 by way of a signal line 6, thereby enabling control and/or regulation of the motor 7 by the control device 1. The motor 7 is in the form of an electric motor, for example, and acts on a torsion bar 9 by way of a transmission 8. A steering means 10, such as a steering wheel, is mounted on the torsion bar 9, by way of which a torque can be applied to the torsion bar 9 by a driver by actuating the steering means 10.

The steering device 2 further comprises a steering gear 11, which is in the form of a rack-and-pinion steering mechanism, for example. The steering gear 11 can also be in the form of a recirculating ball gear or a recirculating ball and nut gear. The following description is based primarily on rack-and-pinion steering, wherein the steering gear comprises a pinion 12a and a rack 12b. The type of steering is irrelevant to the invention, however. The steering device 2 depicted in FIG. 1 could, for example, be in the form of ball-and-nut steering or caster steering, instead of rack-and-pinion steering.

The steering gear 11 is connected by way of the pinion 12a and the rack 12b to a steering linkage 13 at each side of the vehicle, which interacts with a wheel 14.

The steering device 2 further comprises a torque sensor 15 for detecting a steering torque acting on the steering by way of a steering shaft. To this end, according to the embodiment depicted in FIG. 1, a torsion bar torque tor_TB, which corresponds to the aforementioned steering torque, is detected using the torque sensor 15. The steering device 2 also comprises an angular-position sensor 16 for detecting a rotor angle ang_RA of the motor 7. The rotor angle ang_RA corresponds to an angle of rotation of the torsion bar 9 and, therefore, a steering angle of the wheels 14, since the motor 7 is connected by way of the transmission 8 to the torsion bar 9 which is connected to the wheels 14 by way of the steering gear 11 and the steering linkage 13.

The values registered by the sensors 15 and 16 are fed to the control device 1.

The steering device depicted in FIG. 1 represents one of a variety of possible embodiments of steering devices which are suitable for carrying out the method according to the invention. In another embodiment, the steering gear is in the form of a recirculating ball and nut gear, for example. According to another exemplary embodiment, the motor 7 can also be disposed such that it acts together with the torsion bar 9 on the pinion 12a disposed in the steering gear 11, or acts directly on the rack 12b by way of a further pinion.

According to a further embodiment, instead of the rotor angle ang_RA, another variable which describes a current position of the steering device 2 is determined and used to carry out the method according to the invention. For example, the steering angle can be determined using an angular-position sensor mounted on the torsion bar 9. A current position of the steering device 2 could furthermore be registered using a sensor mounted on the rack 12b. In principle, a variety of known variables could be determined or used here. The use of the rotor angle ang_RA has the advantage, however, that it can be determined very precisely and is often already available in modern steering devices.

Figure 2:
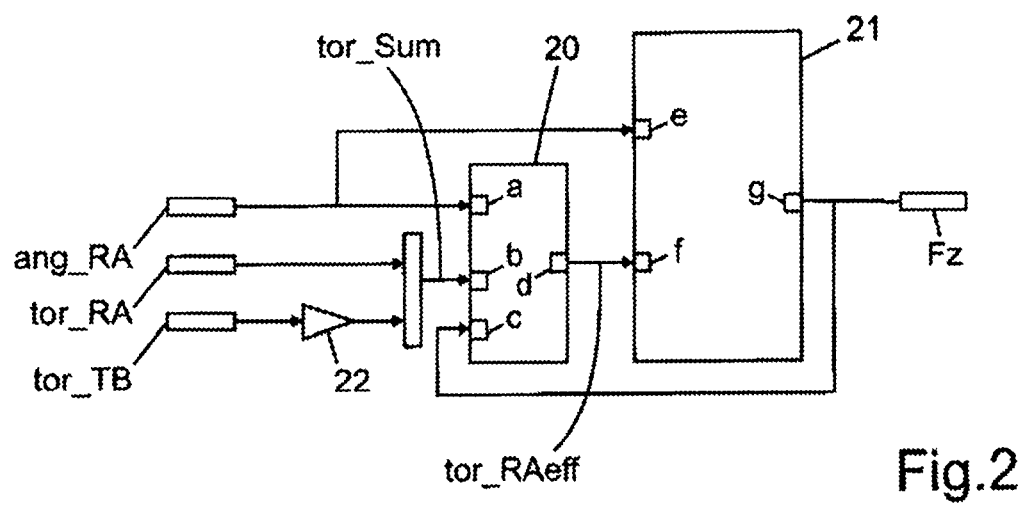
FIG. 2 is a schematic block diagram to illustrate the feedback structure including an estimator and a functionally for calculating efficiency.

FIG. 2 depicts a functionality 20 for calculating efficiency, and an estimator 21. The functionality 20 has inputs a, b, c and an output d. The estimator 21 has inputs e, f, and an output g.

The estimator 21 determines forces Fz acting from the outside on the steering on the basis of a motor angle ang_RA and the effective motor torque tor_RAeff provided by the functionality 20. The estimator 21 can be in the form of a so-called perturbation observer (PO), for example, which permits calculation of a motor torque, by way of which a disturbance value can be compensated, wherein the force acting from the outside or the resulting rack force is considered a disturbance value to be compensated. Perturbation observers are described, for example, in "SangJoo Kwon and Wan Kyun Chung; Perturbation Compensator based Robust Tracking Control and State Estimation of Mechanical Systems; *Lecture Notes in Control and Information Sciences* No. 307, 2004".

The estimator 21 can also be in the form of a so-called "unknown input observer" (UIO). Unknown input variables can be determined using an unknown input observer. To this end, the rack force or the force acting from the outside is considered to be an unknown input variable. Unknown input observers are described, for example, in "Pau-Lo Hsu, Yow-Choung Hong and Syh-Shiuh Yeh; Design of an Optimal Unknown Input Observer for Load Compensation in Motion Systems; in *Asian Journal of Control*, vol. 3, No. 3, pages 204-215, September 2001".

By way of the estimator 21, it is possible, in principle, to determine the rack force or the forces Fz acting from the outside from a detected motor torque tor_RA. However, the values estimated in this manner differ significantly from the values that are actually measured, thereby resulting in imprecise and unreliable values and, therefore, to an unreliable force level to be presented at the steering wheel.

According to the invention, the motor torque tor_RA is therefore not transmitted directly to the estimator 21, but instead the effective motor torque tor_RAeff is determined on the basis of the motor torque tor_RA and the steering torque and the torsion bar torque tor_TB using the functionality 20, wherein an efficiency is taken into account. The functionality 20 receives, as inputs, the rotor angle ang_RA—or another variable which characterizes the current position of the steering device 2—and a sum of the motor torque tor_RA and the torsion bar torque tor_TB, which is referred to as tor_Sum. According to the embodiment depicted in FIG. 2, the torsion bar torque tor_TB is not added directly to the motor torque tor_RA, but rather losses are accounted for in an element 22, which occur due to friction in bearings, joints and the like, for example, and reduce the torque applied by way of the steering means 10.

FIG. 2 furthermore shows that the value estimated by the estimator 21 for the force Fz acting from the outside is fed back from the output g of the estimator 21 to the input c of the functionality 20. The estimated rack force for the determination of the effective motor torque tor_RAeff is therefore made available by way of feedback.

Figure 3:
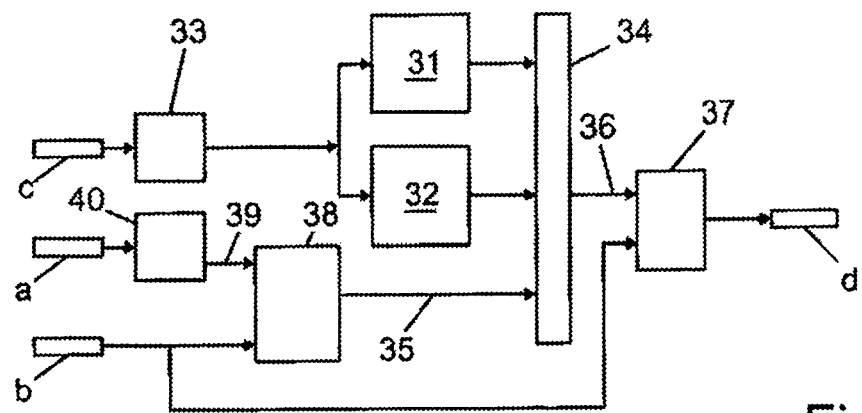
FIG. 3 is a schematic block diagram of a functionality for calculating efficiency.

FIG. 3 shows a schematic block diagram of one possible embodiment of the functionality 20. As shown in FIG. 2 the rotor angle ang_RA, the total torque tor_SUM resulting from the sum of the motor torque tor_RA and the torsion bar torque tor_TB, and the force Fz provided by the estimator 21 at the output g are supplied by way of the inputs a, b, c.

The efficiency is determined on the basis of characteristic curves 31, 32 as a function of the fed-back force Fz. The characteristic curve 31 is provided for operation as a motor, for example, and the characteristic curve 32 is provided for operation of the motor 7 as a generator. According to the potential embodiment depicted in FIG. 3, an absolute value of the force Fz is first generated in an element 33, in order to disregard the direction of the force acting from the outside. The associated efficiencies are then read out of the characteristic curves 31 and 32, and are transmitted to a functional unit 34.

Furthermore, a signal 35 is present at the functional unit 34, which describes the power flow direction of the motor 7, i.e. whether the motor 7 is operated as a motor or a generator. Depending on the signal 35, the efficiency corresponding to the current power flow direction is selected in the functional unit 34. The efficiency determined in this manner is then forwarded by way of a signal 36 to a functional unit 37 in which the effective motor torque tor_RAeff is determined, for example, by multiplying the efficiency by the total torque tor_Sum present at the input b.

The signal 35 is generated in a functional unit 38 by multiplying the total torque tor_Sum by a signal 39 generated on the basis of the rotor angle ang_RA. The signal 39 is generated in the functional unit 40. The functional unit 40 makes it possible, for example, to account for time dynamics, and so a slight inertia of the total system is achieved, whereby dynamic forces can be accounted for accordingly.

An essential element of the present invention is that the estimator 21 is acted upon not by the motor torque tor_RA, but rather by the effective motor torque tor_Raeff, and therefore a load-dependent efficiency is taken into account. The efficiency itself is determined on the basis of the estimated rack force or the estimated force Fz acting from the outside, and therefore the estimated force Fz is fed back.

A variety of further embodiments are feasible, of course. For example, further functional units can be provided, in which further possible frictional losses or temperature dependencies can be taken into account. Furthermore it is possible to first determine which of the characteristic curves 31, 32 should be used based on the current power flow direction, and to then read the efficiency from the suitable characteristic curve. Furthermore, the functionality 20 can also be implemented directly in the estimator 21.

In particular, the method can be coded in a computer program in a variety of ways, and can therefore be implemented in the control device 1 with highly diverse functionalities. The computer program can be stored on a memory element comprising a variety of possible memory elements, wherein the memory element does not necessarily need to be disposed in the control device 1.

The invention claimed is:

1. A method using an estimator to determine a force (Fz), which acts from the outside on a steering gear of a steering device in a vehicle by way of a steering linkage, wherein a motor for generating a motor torque (tor_RA) is assigned to the steering device, wherein the force (Fz) acting from the outside is estimated by way of the estimator as a function of an effective motor torque (tor_RAeff), wherein the effective motor torque (tor_RAeff) is determined as a function of an efficiency, the efficiency being determined as a function of the estimated force (Fz).

2. The method according to claim 1, wherein the force (Fz) is estimated as a function of a steering angle.

3. The method according to claim 2, wherein the steering angle is a rotor angle (ang_RA) of the motor (7).

4. The method according to claim 1, wherein a total torque tor_Sum is generated as a sum of a steering torque (tor_TB) acting on the steering device by way of a steering shaft, and the motor torque (tor_RA), and the effective motor torque (tor_RAeff) is determined as a function of the total torque tor_Sum.

5. The method according to claim 1, wherein the motor torque (tor_RA) describes an actual torque or a target torque.

6. The method according claim 1, wherein the effective motor torque (tor_RAeff) is determined as a function of a rotor angle (ang_RA) of the motor.

7. The method according to claim 6, wherein the efficiency is determined by way of at least one characteristic curve.

8. The method according to claim 1, wherein the efficiency is determined as a function of a power flow direction of the motor.

9. The method according to claim 8, wherein the power flow direction is determined as a function of the motor torque (tor_RA) and a rotor angle (ang_RA) of the motor.

10. A non-transient computer-readable medium having a computer program product which can run on a control device for the control and/or regulation of a steering device, the control device comprising a microprocessor configured for executing the computer program product, wherein the computer program product programs the control device is programmed to carry out a method according to claim 1.

11. A non-transient computer-readable medium according to claim 10, wherein the computer program product is stored on a memory element.

12. A control device for the control/regulation of a steering device in a vehicle, wherein the steering device comprises a steering linkage, a steering gear and a motor, and wherein the steering device comprises means for detecting a motor torque (tor_RA) and an estimator for determining a force (Fz) acting from the outside on the steering gear, wherein the estimator is designed to determine the force (Fz) on the basis of an effective motor torque (tor_RAeff), and the control device has a processor that determines an efficiency as a function of the force (Fz) fed back by the estimator to the processor, and for determining the effective motor torque (tor_RAeff) as a function of the motor torque (tor_RA) and the efficiency.

13. The control device according to claim 12, wherein the estimator is designed to determine the force (Fz) as a function of a steering angle.

14. The control device according to claim 13, wherein the steering angle is a rotor angle (ang_RA) of the motor (7).

15. The control device according to claim 12, wherein the motor torque (tor_RA) is an actual torque or a target torque.

16. The control device according to claim 12, wherein the processor is designed to determine the effective motor torque (tor_RAeff) as a function of a rotor angle (ang_RA) of the motor.

17. The control device according to claim 12, wherein at least one characteristic curve for determining the efficiency is stored in the control device.

18. The control device according to claim 12, wherein the processor is designed to determine the efficiency as a function of a power flow direction of the motor.

19. The control device according to claim 18, wherein the processor is designed to determine the power flow direction as a function of the motor torque (tor_RA) and a rotor angle (ang_RA) of the motor.

* * * * *